Oct. 28, 1969  R. FOSTER ET AL  3,474,839
DEBARKING MACHINE

Filed Sept. 20, 1966  3 Sheets-Sheet 1

INVENTORS
ROSS FOSTER and
WARREN FOSTER

BY *Hurvitz & Rose*

ATTORNEYS

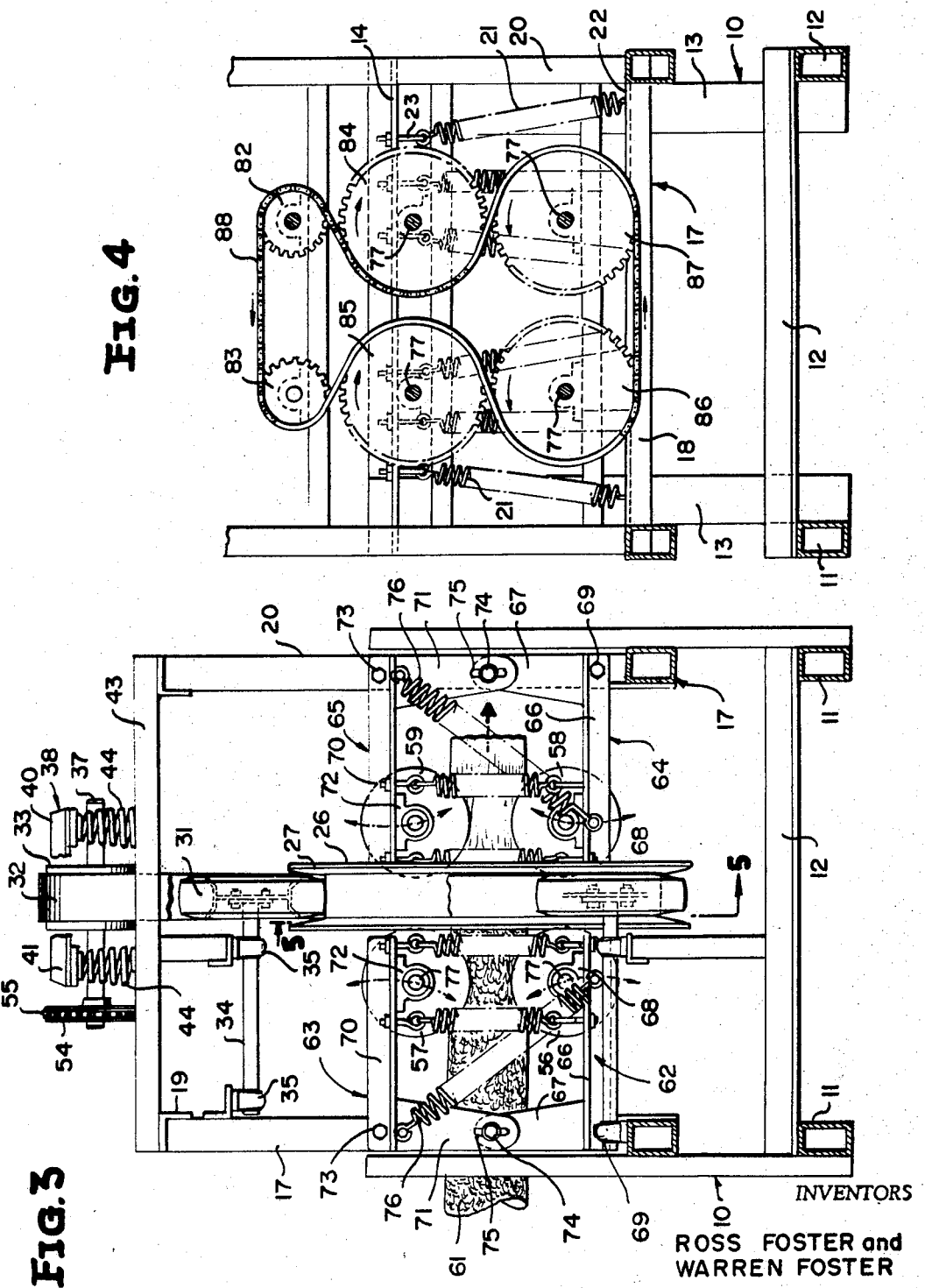

Oct. 28, 1969 R. FOSTER ET AL 3,474,839
DEBARKING MACHINE
Filed Sept. 20, 1966 3 Sheets-Sheet 3
FIG.5
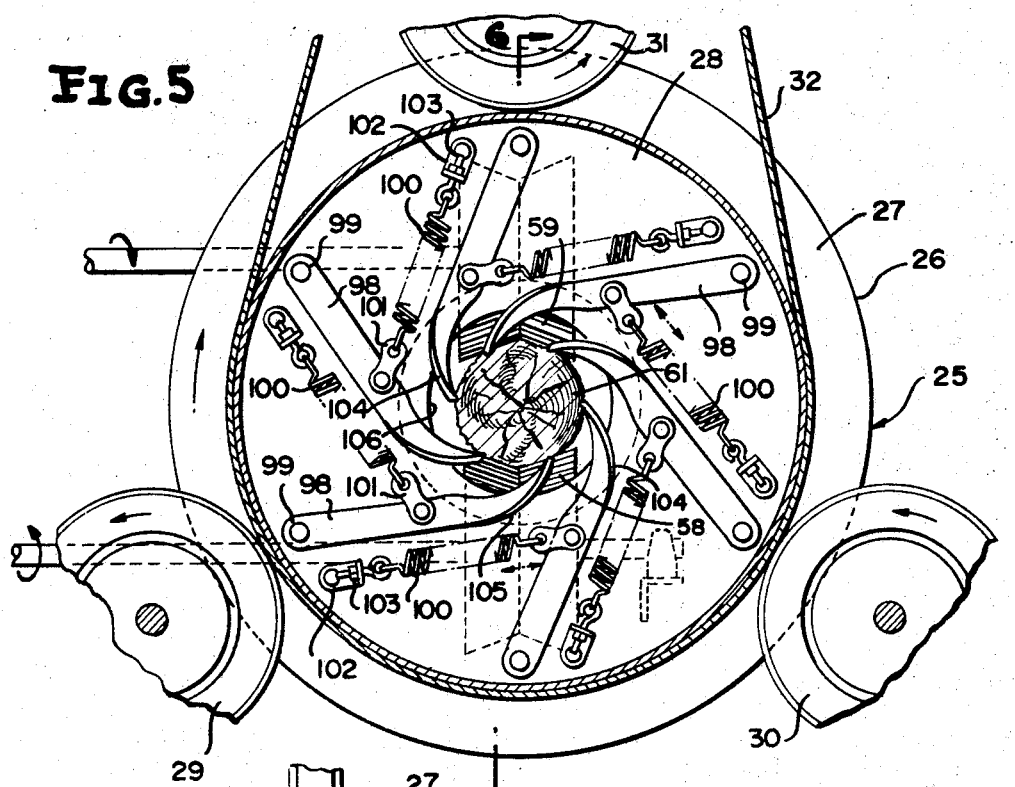
FIG.6
FIG.7
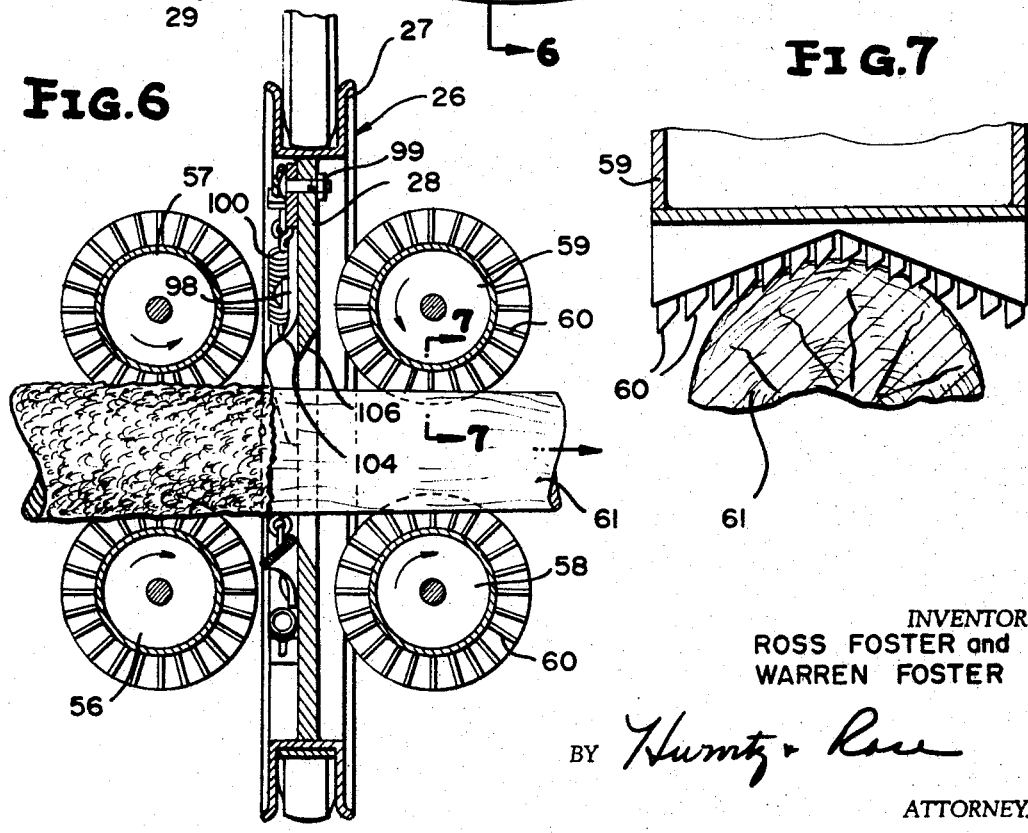
INVENTORS
ROSS FOSTER and
WARREN FOSTER
BY *Hurwitz & Rose*
ATTORNEYS

United States Patent Office 3,474,839
Patented Oct. 28, 1969

3,474,839
DEBARKING MACHINE
Ross Foster, Rte. 1, Box 750, Vinton, La. 70668, and
Warren Foster, 3305 Red Bluff, Pasadena, Tex. 77503
Filed Sept. 20, 1966, Ser. No. 580,786
Int. Cl. B27l 1/00; B27g 13/00
U.S. Cl. 144—208                        11 Claims

ABSTRACT OF THE DISCLOSURE

A post debarking machine has a pair of rigid frames, one of which is suspended on the other for lateral movement relative to the direction of movement of a log or post fed through the machine. A bark peeling head is itself rotatably suspended in the suspended frame and is restricted to translational movement therewith, but is arranged to undergo selective rotation independently of any translational movement of the suspended frame. The bark peeling head includes a rotatable ring and a plurality of knives or cutters pivotally mounted about the ring and biased inwardly toward its center. Rollers are provided on the suspended frame to feed and guide logs or posts whose bark is to be removed through the bark peeling head. A motor and drive arrangement provides the necessary rotation of the bark peeling head and the rollers to produce the bark stripping operation as the posts are fed and guided by the rollers through the peeling head.

---

The present invention relates to improvements in log or post debarking machines of the type having a rotatable drum with bark peeling knives pivotally carried adjacent the periphery of the drum for stripping bark from logs fed therethrough.

One object of the present invention is to provide a novel feed arrangement for feeding logs through the debarking mechanism and at the same time insuring proper centering of the logs during the debarking operation.

Another object is the provision of novel cutting knives which are automatically forced into proper cutting contact with the log being debarked even though there is a large variance in the diameters of the logs passing through the debarking mechanism.

A further object is to provide a novel mounting arrangement for the debarking mechanism to permit movement of same under various conditions.

Still another object of the present invention resides in providing a novel mounting of the bark peeling knives whereby both the outer bark and inner bark may be removed without marring or scratching the wood lying beneath the inner bark.

A further object is to provide a finger tip control of the speed of the log passing through the cutting blades.

A still further object of the present invention is to provide a relatively simple yet extremely rugged debarking machine which is readily portable, easy to maintain, and inexpensive to manufacture.

Figure 1:
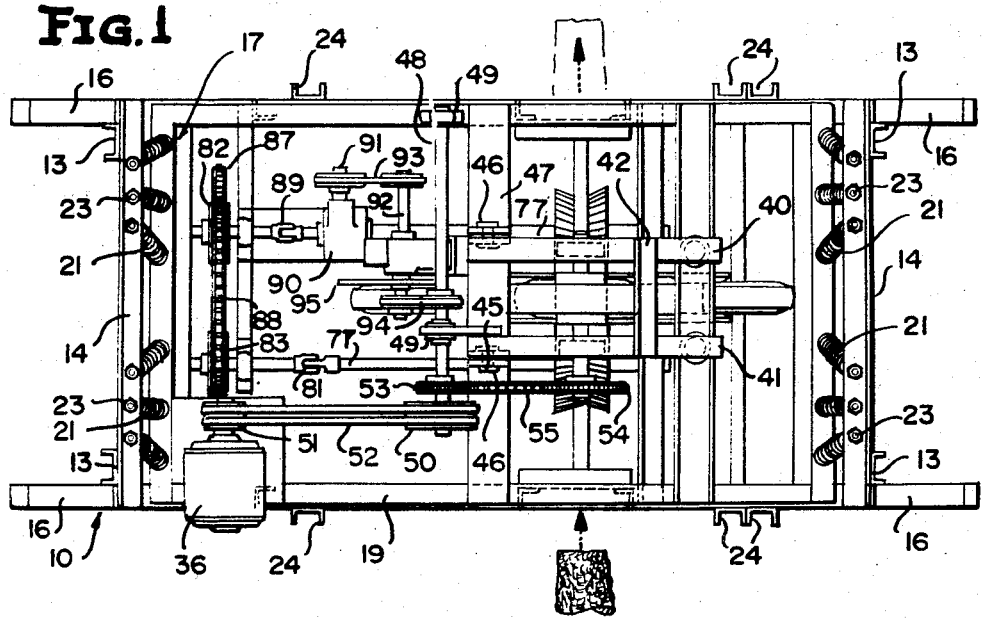
Figure 2:
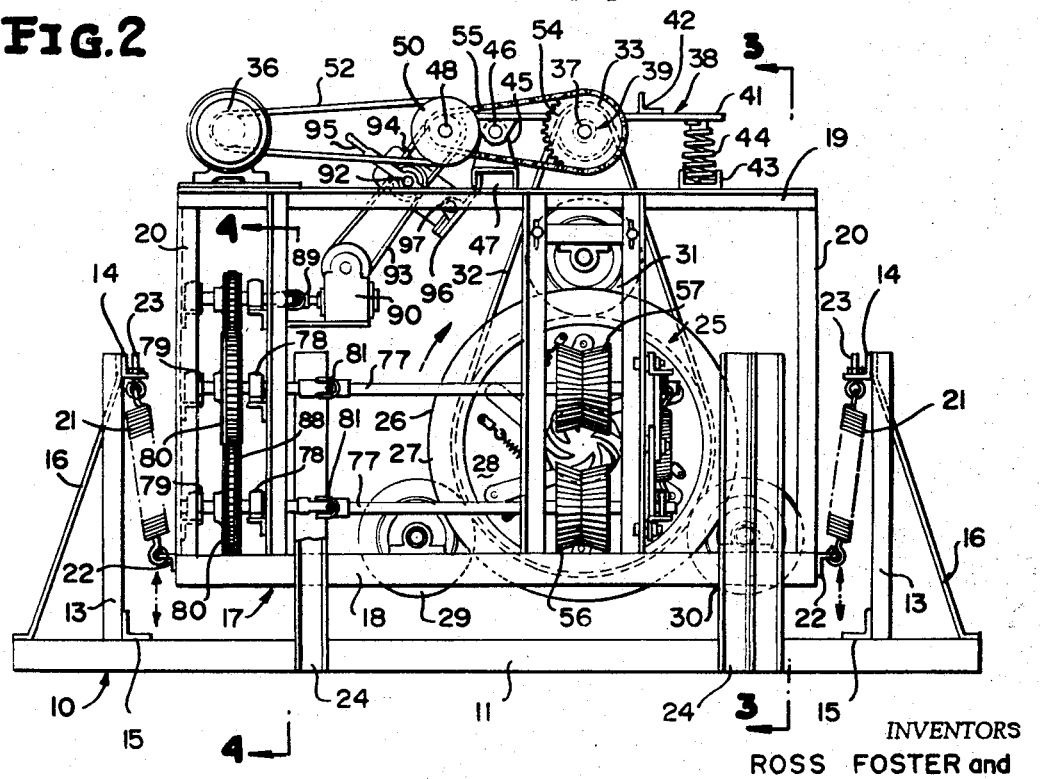

Further novel features of the present invention will become apparent from the following detailed description taken in conjunction with the accompanying drawings, wherein:

FIGURE 1 is a top plan view of the debarking machine forming the subject matter of the present invention;
FIGURE 2 is a side view of the machine illustrated in FIGURE 1;
FIGURE 3 is an end view taken on the line 3—3 of FIGURE 2;
FIGURE 4 is a sectional view taken on the line 4—4 of FIGURE 2;
FIGURE 5 is an enlarged sectional view taken on the line 5—5 of FIGURE 3;
FIGURE 6 is an enlarged sectional view taken on the line 6—6 of FIGURE 5; and
FIGURE 7 is an enlarged sectional view taken on the line 7—7 of FIGURE 6.

Referring to the drawings in detail wherein like numerals denote like parts throughout the several views and particularly to FIGURES 1 and 2, numeral 10 denotes a rigid, rectangular suspension frame formed of longitudinal bars 11 secured in any suitable manner to transverse bars 12. Vertical bars 13 are anchored to each of the bars 11 adjacent their ends and transverse angle irons 14 connect the upper ends of each pair of vertical bars 13. To insure the rigidity of the frame so formed, transverse angle irons 15 are welded to the vertical bars 13 and to the longitudinal bars 11 at their juncture as seen in FIGURE 2 and as further shown in said figure, struts 16 are secured between the angle irons 14 and the outer ends of longitudinal bars 11.

The suspended frame which carries the entire debarking mechanism to be described comprises an open cage generally indicated by the numeral 17. The open cage comprises a lower rectangular frame 18 of slightly less size than the suspension frame 10, a rectangular upper frame 19 and vertical connecting bars 20 at each corner of the lower and upper frames 18 and 19. The cage 17 is spring suspended from the suspension frame by means of a plurality of coil springs 21 anchored at their lower ends to transverse angle irons 22 secured to the lower frame 18 and secured at their upper ends to angle irons 14 by threaded anchor bolts 23. Vertical channel irons 24 are secured to the longitudinal bars 11 and serve as stability supports for the suspended open cage 17, permitting the cage 17 to move up and down and towards each end of the suspension frame but not from side to side, for a purpose to be described.

A debarking peeling head, indicated by numeral 25, is rotatably mounted and supported within the suspended cage 17. The peeling head consists of a drum 26 having an outer flanged rim 27 and an inner flat ring member 28 to which the bark removing knives are secured in a manner to be described. The flat ring member 28 has a central opening slightly larger than the largest diameter of a log or post from which the bark is to be peeled. The present machine is adapted to peel any size log from two to eight inches without changing the drum. Larger posts or logs can be handled by changing the size of the drum and the drum opening.

The peeling drum is mounted with its axis horizontally disposed normal to the longitudinal beams 11, and is rotatably supported in a fixed position by cooperation with three equilaterally arranged pneumatic rubber tires 29, 30 and 31 to serve as pilot wheels for the peeling drum. The drum itself will be suspended on a three or four inch wide belt 32 carried by a driving pulley 33 mounted directly above the top pilot wheel. The top tire 31 will run inside the flanged rim 27 against the surface of the drum, and the bottom two tires 29 and 30 run on the outside of the belt that drives the drum but still inside the rim channel or flange 27.

As seen in FIGURE 3, the upper pilot wheel 31 is mounted on shaft 34 which in turn is mounted in ball bearing pillow blocks 35. The shaft 34 has one end extending from the side of the cage or chassis 17 and has its other end terminating at the pilot wheel 31 to enable ready removal of the wheel when necessary. Each of the pilot wheels 29 and 30 is mounted in a similar manner.

The motor for driving the peeling drum is mounted on top of the cage 17 and is indicated by numeral 36. The driving pully 33 is supported on shaft 37 which is mounted on suspension frame 38 through ball bearing pillow blocks 39. The suspension frame consists of two spaced bars 40 and 41 held in rigid spaced relationship by angle iron 42. As seen in FIGURE 2, the free ends of bars 41 and 42 are spaced above a transverse channel bar 43 forming part of the cage 17 and coil springs 44 are connected between said ends and said channel bar. The opposite ends of the bars 40 and 41 are pivotally mounted to blocks 45 by through pivot pins 46. The blocks 45 are supported by transverse bar 47 rigidly secured to cage 17. The coil springs 44 function to increase the tension on pulley belt 32.

As seen in FIGURE 1, a shaft 48 is supported in pillow blocks 49 supported on top of the cage 17, and has a driven pulley 50 mounted on its free end. The pulley 50 is connected to the motor pulley 51 through a pulley belt 52. Spaced inwardly from the pulley 50 and mounted on shaft 48 is a sprocket wheel 53 which drives the sprocket wheel 54 mounted on shaft 37 through a sprocket chain 55 thus turning the drum 25.

The feed and guide mechanism of the present machine comprises two sets of rollers, one set positioned at one side of the peeling drum to form intake rollers and the other set of rollers positioned on the other side of the peeling drum to form discharge rollers, as shown in FIGURES 3 and 6. The intake rollers are indicated by numerals 56, 57 and the discharge rollers are indicated by numerals 58, 59. Each roller is shaped in the form of a wide angled "V" with teeth 60 adapted to bite into the log 61 to positively feed the log through the peeling drum and to prevent rotating of the log while the bark is being peeled therefrom.

The rollers 56, 57, 58 and 59 are all self centering to keep the post or log in the center of the peeling drum at all times during the passage of the post or log through said drum. A self centering device is provided for each of the aforesaid rollers and the four self centering devices are indicated by the numerals 62, 63, 64, 65. The self centering devices are similarly constructed and referring to FIGURE 3, the self centering device 62 consists of an L-shaped bracket having a horizontal arm 66 and an upwardly directed vertical leg 67. The roller 56 is connected to the free end of arm 66 by means of a self centering ball bearing pillow block 68 and the self centering device 62 is in turn pivotally attached to the cage frame by a pivot bolt 69. The self centering device 63 cooperates with device 62 and lies directly above 62. It consists of an L-shaped bracket having a horizontally disposed arm 70 and a downwardly directed vertical leg 71. The roller 57 is connected to the free end of arm 70 by means of a self centering ball bearing pillow block 72 and the device 63 is pivotally attached to the cage frame by a pivot bolt 73.

The free ends of the two vertical legs 67 and 71 overlap each other slightly and are bolted together to provide a slight movement between the legs in a vertical direction and this is accomplished by anchoring a pivot bolt 74 to leg 67 and a slot 75 in leg 71 to receive the bolt 74. A coiled spring 76 having one end anchored to upper device 63 and its other end anchored to lower device 62 serves to draw the two rollers 56 and 57 towards each other thus insuring a positive grip on the log 61. The slot and bolt arrangement enables the rollers 56 and 57 to move towards and away from each other to accommodate logs or posts of different diameters. The discharge rollers 58 and 59 are supported in a manner similar to the intake rollers and the centering devices 64 and 65, being of the same construction as centering devices 62 and 63 have the same reference numerals applied to similar parts.

The driving mechanism for the intake and discharge rollers will be described as follows: Each of the rollers is mounted on drive shafts 77, two of which are shown in FIGURE 2 and on which the rollers 56 and 57 are mounted. The right hand end of each of the shafts as viewed in FIGURES 1 and 2 are supported for rotation in pillow blocks 68 and 72. The opposite ends of the shafts 77 are supported on the cage 17 at two points by pillow blocks 78, 79 and between these two pillow blocks the shaft carries a sprocket wheel 80. Each of the shafts 77 is also provided with a universal joint 81 to insure rotation of the rollers which are adjustable depending on the diameter of the logs being debarked. The intake and discharge rollers are driven by a set of chain sprockets which turn in the proper direction by winding a chain through the sprockets to get the desired direction of rotation for each individual drive rollers, as indicated in FIGURE 4. Numeral 82 denotes the driving sprocket, 83 the idler sprocket, 84, 85, 86 and 87 the driven sprockets and 88 the sprocket chain.

The drive system will have finger tip control of the speed of the drive rollers by the use of a variable speed "V" belt drive. This will allow the speed of the feed to be speeded up for the smaller or easier to peel post and to be slowed down for the larger or harder to peel post. As seen in FIGURES 1 and 2, the driving sprocket is driven by shaft 89 carried by reduction box 90, and geared to shaft 91, which in turn is connected to shaft 92 by pulley 94, and the shaft 92 may be moved toward or away from shaft 48 by lever 95, pivoted to base member 96 by pivot pin 97, thus producing the speed changing effect.

Referring to FIGURES 5 and 6, the bark peeling knives of which six are shown, are indicated generally by the numeral 98. These knives are designed and positioned so that they will peel any size post from two to eight inches in diameter without any changing of the knives. Each knife is pivotally mounted on the flat ring member 28 by means of a bolt 99 passing through the ring and knife. A coil spring 100 is secured to each knife at 101 and to the flat ring member at 102 and serves to constantly urge the debarking edge of the knife towards the center of the opening in the flat ring member through which the posts are fed. The coil spring is anchored to the ring member by means of a threaded connecting bolt 103 by means of which the mount of tension on each knife can be adjusted for smoother operation. The amount of tension needed to peel a post in the summer is less than in the winter because the tree is growing rapidly and the bark can be removed relatively easy.

The cutting knife 98 is designed with a slow, counter clockwise spiral of approximately 90 degrees that begins about four inches from the cutting end of the knife as indicated by numeral 104. This spiral edge is provided to give the end of the post contact with the knife so that the post will separate the knives easily without jamming the end of the post directly against the edge of the knives when first contacting same. The knife will be tapered in size beginning at approximately four inches from the cutting point to the cutting point. It will also taper approximately one inch from the outside edge of the knife toward the inside edge. This will allow the post to come in contact with the knife, and open the knife gently by screwing itself on the end of the post as the drum rotates. Approximately one half inch from the point, the front edge of the knife will be sharpened so as to cut the bark into small pieces. The peeling edge in the center of the tool will be relatively dull so it will not cut into the wood around knots, hollow or flat places. The spring tension on the knife will remove the inner bark by means of the pressure applied by the spring tension.

The back side 105 of the knife will be sharpened so as to cut the bark into small pieces so that if any bark starts to collect on the knives, a larger post can be inserted which will force the sharpened back side of the knife against the sharpened edge 106 of the flat ring member thereby causing the collected material to be cut into smaller pieces. The peeling edge of the knife will come into contact with surface of the post at approximately 45 degrees at all times whether the post is large or small due to the positioning of the blades on the ring member. The provision of a 45 degree angle for the cutting edge provides the best peeling angle.

In operation, starting of the motor 36 will simultaneously start rotation of the feed rollers 56, 57, 58 and 59 and of the debarking drum 26. A conveyor belt, not shown, will bring the pole or log to the debarking mechanism. The conveyor belt is positioned with respect to the debarking mechanism so that the center of the drum will be suspended approximately six inches above the conveyor belt. Thus, the top end of the pole will engage the feed roller and stretch the suspension springs to float the machine over the piling using the power of the feed rollers to adjust the machine to the level of the conveyor, and the best position for peeling the post. The machine will be free to move to the left or right or up and down but will not tilt forward or backwards due to the position of the upright stability supports 24. To adjust the device to a small pole or piling, the bottom roller will first engage the top portion of the pole and the power of the self centering device will be used to stretch the pull springs 76 and lower the whole debarking device to the center level of the pole and to the level of the conveyor mechanism with the bottom feed roller. The average size pole or piling will already be centered and very little adjustment will be needed. The large pole or piling will engage the upper feed roller first and will climb up on the top end of the pole or piling and by using the power of the self centering device will be used to compress the suspension frame spring and center the post in the center of the machine.

The intake rollers 56 and 57 will guide the post into and through the cutting head and into the discharge rollers 58 and 59 which will hold the post in the center of the cutting head and pull the rear end of the post through the cutting head. The cutting knives are pivotally mounted on the rotating drum and held in proper position by the spring tension of springs 100. This tension is designed so that the knives are held against the post in nearly even tension so that they can peel the bark from around knots, flat places and crooks. The cutting head is suspended on a wide flat belt and held in place by the three inflated tires 29, 30 and 31. This will serve as a drive pulley and to hold the cutting head in a relatively fixed position. The rubber tires serve to suspend the cutting head so that it can move in any direction up to one inch to follow the contour of the post. Any crook more than this will be taken care of by the cutting knives as they will peel in any position up to three inches off center. The machine is constructed to peel a post at any speed from 1 r.p.m. up to approximately 300 r.p.m. The drive system will have finger tip control of the speed by the use of the variable speed "V" belt drive. This will allow the speed of the feed to be speeded up for easy peeling or for small posts and to be slowed down for the larger or harder to peel post. This can easily be done without stopping the machine or regulating the speed of the motor.

The foregoing description discloses a portable debarking machine which is well adapted to accomplish the objects of the invention. While we have shown and described a specific form of the invention, it will be apparent that changes may be made in the details of this form of construction without departing from the spirit of the invention. It will also be apparent that various modifications may be made which will fall within the scope of the present invention. For example, instead of a single cutting head, multiple cutting heads could be provided which could be spaced about five inches apart with the second cutting head rotating in a direction opposite to the first cutting head. Posts and pilings that are cut at certain times of the year are more difficult to peel or debark than those cut at other times of the year. When using a single cutting head, and when the bark is at it toughest, it is sometimes necessary that the same post be run through the device twice to obtain a complete debarking and a relatively smooth finish. The use of multiple cutting heads eliminates this necessity and results in a more speed accomplishment of the desired function.

Having thus described the invention, what is claimed is:

1. A log debarking machine comprising a suspension frame, a second frame supported by said suspension frame, a debarking mechanism mounted on said second frame and adapted to strip bark from a log fed therethrough, said debarking mechanism comprising a rotatable drum, a plurality of bark peeling knives pivotally mounted on said drum, spring means mounted on said knives and said drum for urging said knives toward the center of said drum, said drum having a channeled rim extending around its periphery, three equidistantly spaced rubber wheels supported by said second frame and received within said channeled rim for resiliently supporting said drum, a pair of opposed V-shaped intake rollers carried on said second frame and disposed in front of said drum, a second pair of opposed V-shaped discharge rollers carried by said second frame disposed in back of said drum and a motor mounted on said second frame for rotating said drum and said rollers, spring suspension means connected between the suspension frame and the second frame, and stabilizer means extending from the suspension frame along two sides thereof and adapted to contact said second frame to prevent to and fro movement of said second frame in one direction.

2. A log debarking machine as defined in claim 1, said opposed intake rollers being supported by arms pivotally mounted on said second frame, spring means connecting said arms for moving said rollers toward each other, said discharge rollers being supported by arms pivotally mounted on said second frame and spring means connecting said arms for moving the discharge rollers toward each other.

3. A log debarking machine as defined in claim 1, and a variable speed belt drive mounted on said second frame for varying the speed of the V-shaped rollers.

4. A log debarking machine as defined in claim 1, said bark peeling knife having a slow, counter clockwise spiral of approximately 90 degrees that begins about four inches from the cutting edge of the knife and said cutting edge being at a 45° angle.

5. A log debarking machine as defined in claim 1, said rotatable drum having rim portion and a flat ring portion having a central opening therein, said rim portion having the free edge thereof sharpened, said bark peeling knives having the back sides thereof sharpened to cooperate with the sharpened edge of said rim portion for cutting the peeled bark into small portions.

6. A log debarking machine as defined in claim 1, drive shafts for the intake and discharge rollers, said drive shafts having universal joints provided therein.

7. A log debarking machine as defined in claim 1, said rotatable drum having rim portion and a flat ring portion having a central opening therein, said rim portion having the free edge thereof sharpened, said bark peeling knives having the back sides thereof sharpened to cooperate with the sharpened edge of said rim portion for cutting the peeled bark into small portions, and bark peeling knife having a slow, counter clockwise spiral of approximately 90 degrees that begins about four inches from the cutting edge of the knife and said cutting edge being at a 45° angle.

8. A post debarking machine, comprising
   a first rigid frame,
   a second rigid frame suspended on said first frame for lateral movement relative to the direction of movement of a post fed through said machine,
   stabilizing means preventing movement of said second frame in the direction of said movement of a post fed through said machine or in a direction opposite thereto,
   a bark peeling head rotatably suspended in said second frame and restricted translationally to movement therewith, for receiving a post to be debarked and for stripping bark therefrom, said head including a rotatable ring having a central opening of larger diameter than the largest post to be fed through said machine, and a plurality of bark peeling cutters pivotally mounted about said ring and biased inwardly toward the center thereof, roller means carried by said further frame for feeding and guiding the posts to be debarked through said bark peeling head, and means for rotating said bark peeling head and said roller means to produce said bark stripping operation as said posts are fed and guided through said peeling head.

9. The debarking machine according to claim 8, wherein said second rigid frame is suspended by springs coupled to said first rigid frame.

10. The debarking machine according to claim 8, wherein said cutters are knives whose cutting edges are biased inwardly toward the center of said ring by springs only.

11. The debarking machine according to claim 8, wherein is further provided means on said second frame for self-centering said roller means relative to said bark peeling head to maintain the post being fed through said machine in the center of said ring.

References Cited
UNITED STATES PATENTS

| | | |
|---|---|---|
| 2,625,968 | 1/1953 | Eklund et al. |
| 2,911,020 | 11/1959 | Wennberg. |
| 2,918,952 | 12/1959 | Searle. |
| 3,098,512 | 7/1963 | Kendrick. |
| 3,108,622 | 10/1963 | Kendrick. |
| 3,115,167 | 12/1963 | Valo. |
| 3,189,067 | 6/1965 | Dillingham. |

FRANK T. YOST, Primary Examiner.

U.S. Cl. X.R.

144—218, 247